(12) United States Patent
Matze et al.

(10) Patent No.: US 11,487,628 B1
(45) Date of Patent: Nov. 1, 2022

(54) SYSTEM AND METHOD FOR RAPIDLY TRANSFERRING AND RECOVERING LARGE DATA SETS

(71) Applicant: R-Stor Inc., Saratoga, CA (US)

(72) Inventors: John Edward Gerard Matze, Carlsbad, CA (US); Anthony P. Gaughan, San Francisco, CA (US); Damian Kowalewski, Sunnyvale, CA (US)

(73) Assignee: R-Stor Inc., Saratoga, CA (US)

( * ) Notice: Subject to any disclaimer, the term of this patent is extended or adjusted under 35 U.S.C. 154(b) by 263 days.

(21) Appl. No.: 15/930,326

(22) Filed: May 12, 2020

Related U.S. Application Data

(60) Provisional application No. 62/847,184, filed on May 13, 2019.

(51) Int. Cl.
| | | |
|---|---|---|
| *G06F 11/14* | (2006.01) | |
| *G06F 11/10* | (2006.01) | |
| *G06F 11/20* | (2006.01) | |
| *G06F 16/909* | (2019.01) | |
| *G06F 16/182* | (2019.01) | |

(52) U.S. Cl.
CPC ...... *G06F 11/1469* (2013.01); *G06F 11/1004* (2013.01); *G06F 11/1092* (2013.01); *G06F 11/1451* (2013.01); *G06F 11/1456* (2013.01); *G06F 11/1464* (2013.01); *G06F 11/2058* (2013.01); *G06F 11/2064* (2013.01); *G06F 16/182* (2019.01); *G06F 16/909* (2019.01)

(58) Field of Classification Search
CPC ............. G06F 11/1004; G06F 11/1092; G06F 11/1435; G06F 11/1451; G06F 11/1464; G06F 11/1469; G06F 11/2064; G06F 11/2082; G06F 3/0619; G06F 21/64; G06F 16/184; G06F 16/1844; H04L 9/3239

See application file for complete search history.

(56) References Cited

U.S. PATENT DOCUMENTS

| | | | | |
|---|---|---|---|---|
| 9,715,521 | B2* | 7/2017 | Barrus | G06F 11/2094 |
| 2007/0011501 | A1* | 1/2007 | Yagawa | G06F 11/2094 |
| | | | | 714/701 |
| 2011/0055179 | A1* | 3/2011 | Arena | H04L 9/3239 |
| | | | | 707/698 |
| 2015/0088827 | A1* | 3/2015 | Xu | G06F 3/067 |
| | | | | 707/634 |
| 2017/0091020 | A1* | 3/2017 | Rat | H03M 13/093 |
| 2017/0255401 | A1* | 9/2017 | Basham | G06F 3/067 |
| 2019/0179542 | A1* | 6/2019 | Sehgal | G06F 3/065 |

OTHER PUBLICATIONS

Dataflair Team, Data Block in HDFS, Nov. 14, 2018, Retrieved from the Internet <https://web.archive.org/web/20181120034642/https://data-flair.training/blogs/data-block/> (Year: 2018).*

* cited by examiner

*Primary Examiner* — Bryce P Bonzo
*Assistant Examiner* — Albert Li
(74) *Attorney, Agent, or Firm* — Rankin, Hill & Clark LLP

(57) ABSTRACT

Systems for rapidly transferring and, as needed, recovering large data sets and methods for making and using the same. In various embodiments, the system advantageously can allow data to be transferred in larger sizes, wherein data may be easily recovered from multiple regions and wherein latency is no longer an issue, among other things.

19 Claims, 4 Drawing Sheets

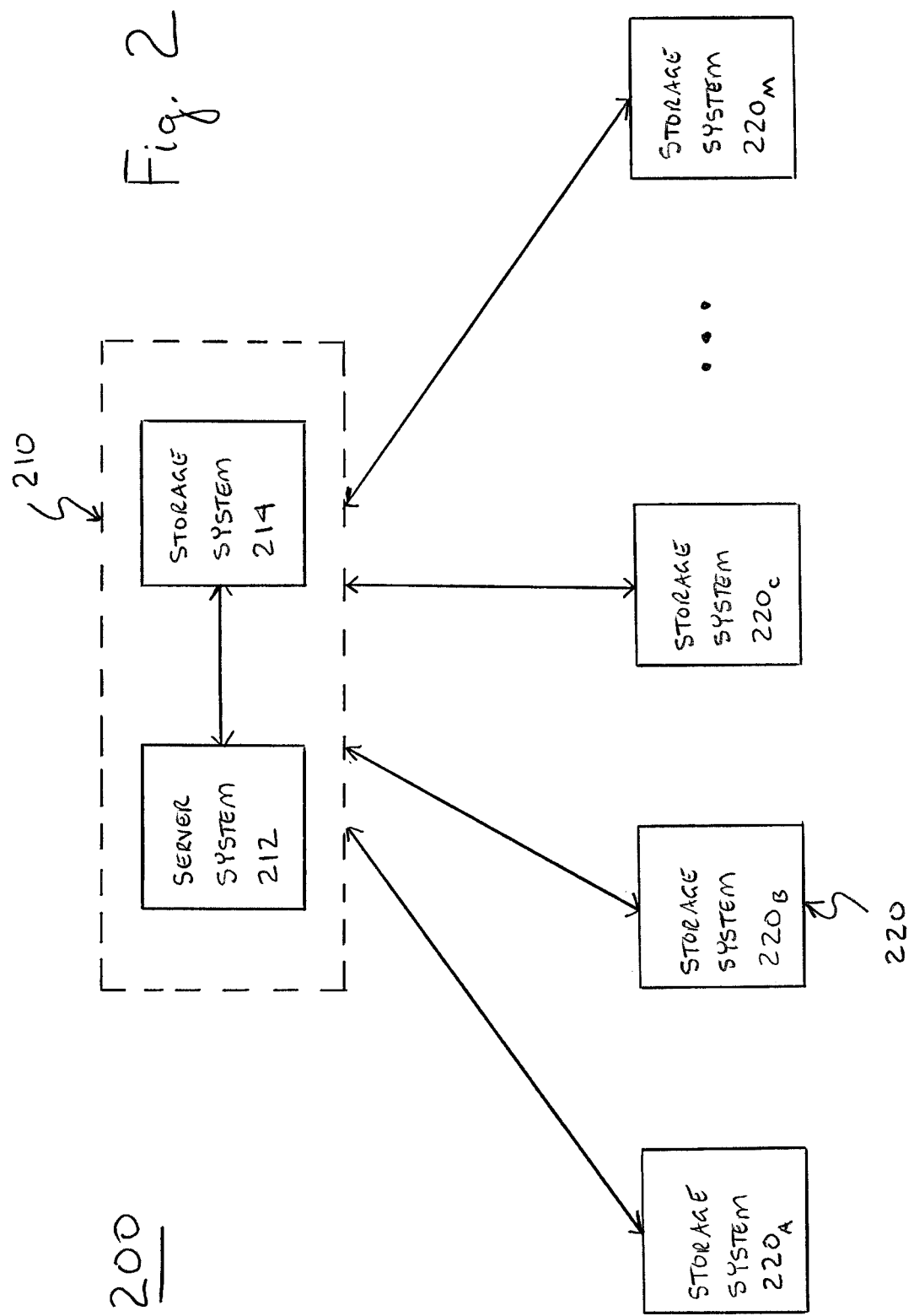

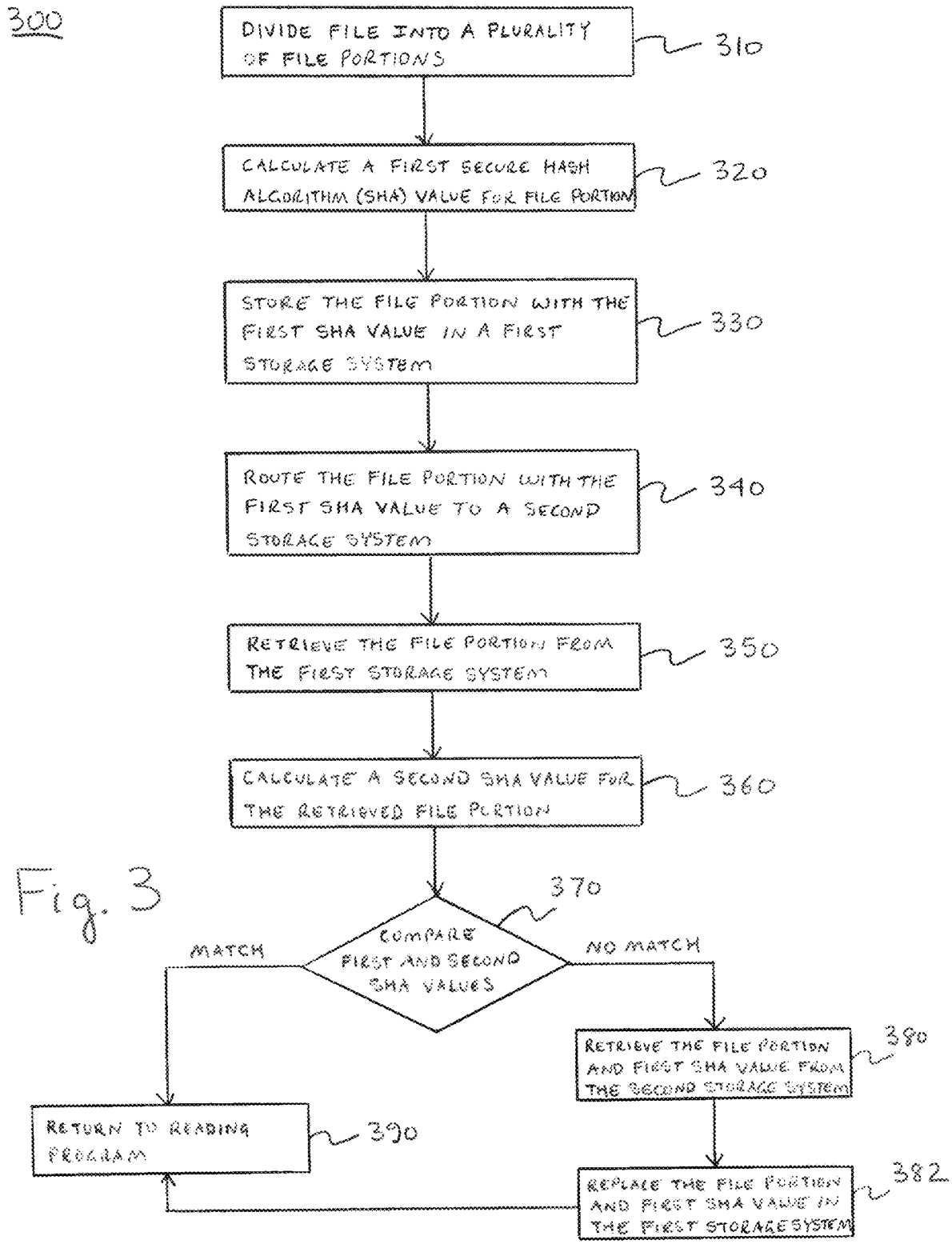

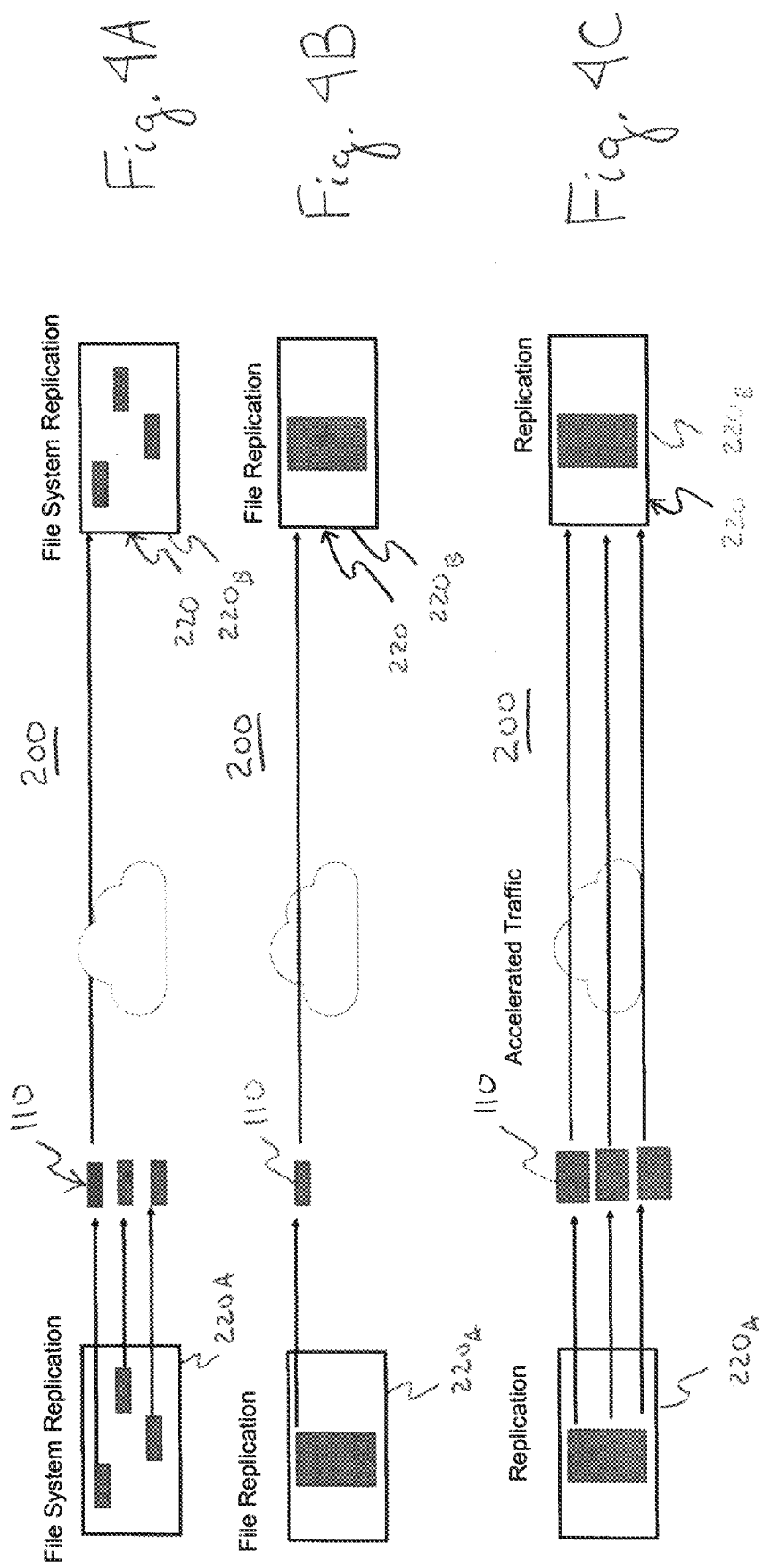

SYSTEM AND METHOD FOR RAPIDLY TRANSFERRING AND RECOVERING LARGE DATA SETS

CROSS-REFERENCE TO RELATED APPLICATIONS

This application claims the benefit of, and priority to, U.S. Provisional Application Ser. No. 62/847,184, filed May 13, 2019, the disclosure of which is hereby incorporated herein by reference in its entirety and for all purposes.

FIELD

The present disclosure relates generally to digital data processing and more particularly, but not exclusively, to systems and methods for rapidly transferring and, as needed, recovering large data sets.

BACKGROUND

Traditionally in a computer storage file platform, files have been saved in traditional file systems, such as New Technology File System (NTFS), XFS, EXT, etc., and the data is protected by underlying Redundant Array of Independent Disks (RAID), which either duplicates all data to multiple drives or protects the data with a calculated parity that allows data to be rebuilt if a disk has been lost. RAID works well in a single disk array environment in a single location but does not scale to multiple regions. Some file systems do allow replication between regions, but these replication points are in small sizes and the system requires a short distance between sites reducing latency.

In view of the foregoing, a need exists for an improved system and method for allowing data to be transferred in larger sizes, wherein data may be easily recovered from multiple regions and wherein latency is no longer an issue, in an effort to overcome the aforementioned obstacles, challenges and deficiencies of traditional computer storage file platforms.

BRIEF DESCRIPTION OF THE DRAWINGS

FIG. 2 is a top-level block diagram illustrating an exemplary embodiment of a data replication system with a plurality of remote storage systems for rapidly transferring and recovering large data sets by replicating the file portions of FIG. 1.

FIG. 3 is a top-level flow chart illustrating an exemplary embodiment of a data replication method for rapidly transferring and recovering large data sets by replicating the file portions of FIG. 1.

FIG. 4A is a top-level block diagram illustrating an alternative exemplary embodiment of the data replication system of FIG. 2, wherein the data replication system supports file system replication.

FIG. 4B is a top-level block diagram illustrating another alternative exemplary embodiment of the data replication system of FIG. 2, wherein the data replication system supports file replication.

FIG. 4C is a top-level block diagram illustrating still another alternative exemplary embodiment of the data replication system of FIG. 2, wherein the data replication system utilized accelerated traffic.

Figure 1:
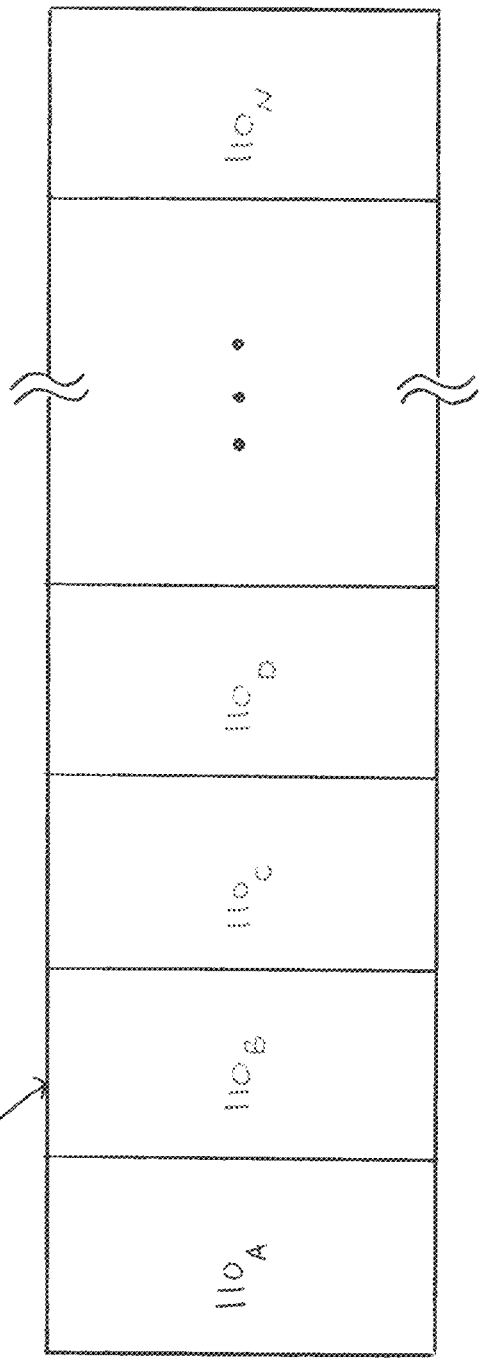
FIG. 1 is a drawing illustrating an exemplary embodiment of a file that has been divided into a predetermined number of file portions.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

Since currently-available computer storage file platforms do not scale to multiple regions, include replication points with small sizes and require short distances between sites, a system and method for rapidly transferring and, as needed, recovering large data sets can prove desirable and provide a basis for a wide range of computer applications.

The system and method disclosed herein can support an ability to replicate file portions (or chunks) of a file at one or more remote geographical regions (or locations). Turning to FIG. 1, a selected file 100 is shown as being separated or otherwise divided into two or more file portions (or chunks) 110. The file 100, for example, can be divided into any predetermined number N of file portions $110_A$, $110_B$, $110_C$, $110_D$, ..., $110_N$ as illustrated in FIG. 1. The file portions 110 can be provided with any predetermined size (or file portion size) and preferably have a predetermined consistent size, such as, 128 MB. File data that does not fit into the file portion size, such as smaller files and/or a first (or last) file portion $110_N$ of the file 100 may be deemed to be a file portion 110 and can be left in a native size.

In the manner set forth above, the file portions 100 of the file 100 can be replicated at one or more remote geographical regions (or locations). FIG. 2 illustrates an embodiment of a data replication system 200 for rapidly transferring and recovering large data sets by replicating the file portions 110 (shown in FIG. 1) of the selected file 100 (shown in FIG. 1). The data replication system 200 is shown as including a central replication system 210, which can be disposed at a predetermined central geographic location and comprise a source of the file 100. The central replication system 210 can include a server system 212 for separating or otherwise dividing the file 100 into the file portions 110; whereas, the resultant file portions 110 can be stored at a storage system 214 of the central replication system 210. In some embodiments, the server system 212 and the storage system 214 can comprise separate systems or can be at least partially integrated.

The server system 212 can comprise any appropriate number and type of conventional processing systems, such as one or more microprocessors (μPs), central processing units (CPUs), digital signal processors (DSPs), and/or coder/decoders (CODECs), and can process the file 100 in accordance with instructions (or commands). Being in operative communication with the server system 212, the storage system 214 preferably includes at least one integrated memory device for storing and providing other conventional types of information, including instruction code, such as software or firmware, intermediate calculation results, and other information associated with the server system 212.

Preferably comprising a non-volatile memory system, the storage system 214 can comprise any conventional type of memory system, such as any suitable electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind. The storage system 214 can include a Redundant Array of Independent Disks (RAID) system.

The data replication system 200 of FIG. 2 also is shown as including a plurality of storage systems 220. The central replication system 210 advantageously can replicate the file portions 110 of the selected file 100 in the storage systems 220. The data replication system 200 can support a virtually unlimited number of storage systems 220 at a virtually unlimited number of locations. The storage systems 220 can include any predetermined number M of storage systems $220_A, 220_B, 220_C, \ldots, 220_M$. In some embodiments, the data replication system 200 can start out with three storage systems 220 located at three geographic locations but may easily scale to multiple storage systems 220 located respective locations, for example, around the world.

Each storage system 220 can be provided in the manner set forth above for the storage system 214, and the storage systems 220 can be provided in a uniform manner and or different manner. In other words, the storage systems 220 can include storage systems 220 with uniform characteristics, such as storage capacity, and/or storage systems 220 with different characteristics. The data replication system 200 thus may use any type of underlying storage, including, but not limited to, disk, Non-Volatile Memory Express (NVME), tape, and/or optical. The data replication system 200 advantageously can operate without any predetermined media requirements at any of the geographic locations. For example, a first storage system $220_B$ at a first geographic storage location may have disk storage; whereas, a second storage system $220_C$ at a second geographic storage location may have optical storage. The data replication system 200 advantageously can be media independent.

The storage systems 220 can be disposed at a respective geographic locations that are geographically distal to, and/or remote from, the central geographic location of the central replication system 210. In selected embodiments, the storage systems 220 likewise can be geographically distal to, and/or remote from, each other and, in some cases, can be distributed at diverse geographic location around the world. Stated somewhat differently, the data replication system 200 can be configured to replace a selected file portion $110_B$ stored in the first storage system $220_B$ at the first storage location with a corresponding file portion $110_B$ stored at the second storage system $220_C$ at the second storage location, wherein the second storage location can be proximal or distal from the first storage location. Thereby, if the selected file portion $110_B$ stored at the first storage systems $220_B$ cannot read or is otherwise deemed to be bad, the corresponding file portion $110_B$ may be recovered by copying the corresponding file portion $110_B$ from the second storage system $220_C$ at the second storage location to the first storage system $220_B$ at the first storage location.

Traditionally, replication systems operate at the block level of the disk system, requiring the source and destination disks to be the same size or equivalent. Other file systems replicate at the file block layer but require immediate response from the remote system. The data replication system 200 advantageously can remove multiple, and preferably all, of the timed responses when storing the file 100 or other data.

Turning to FIG. 4A, the data replication system 200 can support system file (or block) replication at file system levels. Block replication at file system levels can include copy data, such as one or more file portions 110, available at a first storage system $220_A$ and mirroring the available data at a second storage system $220_B$, wherein the second storage system $220_B$ preferably is geographically remote from the first storage system $220_A$ in the manner discussed in more detail above with reference to FIG. 2. During block replication only one side typically is accessed at one time. The block replication at file system levels typically are performed at 512 bytes or 4,096 bytes. Block replication can be serial in nature and/or require large start times (and/or stop times) between sending adjacent file portions 110.

The data replication system 200 is shown in FIG. 4B as supporting file replication. File replication can be similar to block replication as illustrated in FIG. 4A but can transfer file portions 110 that have larger portion sizes than the portion sizes of the file portions 110 transferred using block replication. In selected embodiments, the portion sizes of the file portions 110 transferred via file replication preferably are smaller than 64 Kilobits. File replication can be serial in nature and/or require large start times (and/or stop times) between sending adjacent file portions 110.

Turning to FIG. 4C, the data replication system 200 is shown as supporting replication with accelerated traffic. The data replication system 200 can transmit one or more file portions 110 from a first storage system $220_A$ to one or more second storage systems $220_B, 220_C, \ldots, 220_M$ (shown in FIG. 2) each preferably being geographically remote from the first storage system $220_A$ and each other. Advantageously, the replication method shown in FIG. 4C can permit the data replication system 200 to send the file portions 110 in parallel to the second storage systems $220_B$, $220_C, \ldots, 220_M$ at the multiple regional locations with Transmission Control Protocol (TCP)/Internet Protocol (IP) acceleration of the file portions 110. Advantageously, blocks of file portions 110 can use TCP/IP acceleration to remove even more latency between the storage systems 220.

Whereas current solutions rely on the local disk to do rebuilding, the data replication system 200 advantageously can provide a global rebuild environment.

Additionally and/or alternatively, the data replication system 200 can schedule rebuilds of failed media for any predetermined time in the future.

Returning to FIG. 2, the data replication system 200, unlike traditional replication systems that replicate only pieces of data, advantageously can replicate all stored data in some embodiments. Thereby, if one or more file portions (or chunks) 110 of the file 100 are missing at the first storage system $220_B$ at the first storage location, the data replication system 200 can retrieve the missing file portions 110 from the second storage system $220_C$ at the second storage location. Thereby, the data replication system 200 advantageously can permit file data to be transferred in predetermined large portion sizes such that the file data can be easily recovered in a storage system 220 at a first storage location from a storage system 220 at another storage location without experiencing data transfer latency issues.

Write operations for writing data to some storage systems 220, such as a disk drive system, can be very labor intensive and can present data transfer latency issues. Each write operation requires a lookup for a free location in the disk drive system. Additionally, high-capacity disk drive systems are slow, and each write operation requires an acknowledgement from the disk drive system that the data has been written successfully. Data written in parallel to multiple disk systems can allow the delays to be spread out and thereby decrease an amount of time writing data to disk. Additionally and/or alternatively, cloud storage can provide much more storage capacity compared to enterprise storage. Enterprise systems typically do not have huge storage requirements and thus only write to only one subsystem. This strategy allows cloud-based systems to take advantage of larger subsystems.

An exemplary data replication method 300 for rapidly transferring and recovering large data sets by replicating the file portions 110 (shown in FIG. 1) of the selected file 100 (shown in FIG. 1) is illustrated in FIG. 3. Turning to FIG. 3, the data replication method 300 can divide the file 100 into the two or more file portions (or chunks) 110, at 310. As set forth above, the file portions 110 preferably have a predetermined consistent size (or file portion size), such as, 128 MB. File data that does not fit into the file portion size, such as smaller files and/or a first (or last) file portion 110 of the file may be deemed to be a file portion 110 and can be left in the native size.

In selected embodiments, the data replication method 300 optionally can assign a universally unique identifier (UUID) or other unique global value to each file portion 110. This UUID can be used to keep track of each file portion 110 throughout operation of the data replication method 300.

The data replication method 300, at 320, can calculate a computer hash value for at least one selected file portion 110, and preferably for each file portion, via, for example, a secure hash algorithm (SHA) and, optionally, can calculate a cyclic redundancy check (CRC) value for the SHA value. The computer hash value, SHA value and/or the CRC value can be associated with the relevant file portion 110. In some embodiments, the SHA value and the CRC value can be attached to an end region of the relevant file portion 110. In selected embodiments, the CRC value can be used to determine whether the SHA value is correct, which can be a requirement for bit rot detection that occurs on traditional hard disk media.

The data replication method 300 can write the relevant file portion 110 to the storage system 214 (shown in FIG. 2) at the central geographic location, at 330. The geographic storage location of the relevant file portion 110 can be stored in a database (not shown), which can keep track of all file portions 110 of the file 100 on each storage system 214, 220 (shown in FIG. 2) of the data replication system 200 (shown in FIG. 2).

Once written to the storage system 214, the relevant file portion 110 can be deemed a candidate for replication, at 340, to one or more of the other storage systems 220 at the respective geographic locations associated with the data replication system 200. Each file portion 110 can be stored with the same UUID at the other storage systems 220. Advantageously, each of the other storage systems 220 can determine how and/or where to store the relevant file portion 110 based on local rules of the particular storage system 220.

In selected embodiments, the data replication system 200 can include a routing engine (not shown) for sending the relevant file portion 110 to a predetermined number of storage systems 220. The routing engine, for example, can send the relevant file portion 110 to a minimum of three storage systems 220. Once each of these storage systems 220 has accepted the relevant file portion 110, the data replication method 300 can deem the relevant file portion 110 to be stable.

In selected embodiments, the data replication method 300 optionally can include one or more Bit Rot programs (not shown), which can be run at one or more of the storage systems 220 at which the relevant file portion 110 is stored. The Bit Rot programs can use the CRC value and/or the SHA value to determine whether the relevant file portion 110 remains stored correctly on the storage systems 220. If the relevant file portion 110 on a selected storage system 220 is determined to be bad, the data replication method 300 can replace the bad file portion 110 on the selected storage system 220 with the same file portion 110 from another storage system 214, 220. In other words, the selected storage system 220 overwrite the bad file portion 110 with a corresponding file portion 110 from another storage system 214, 220 of the data replication system 200. For example, failed Bit Rot file portions 110 may be immediately replaced with the same UUID file portion from another storage system 214, 220.

When the relevant file portion 110 of the file 100 is read, the data replication method 300 can read the relevant file portion 110 from the storage system 214, at 350, and preferably performs a SHA on the read file portion 110, at 360, to recreate a new SHA value. At 370, the data replication method 300 can compare the new SHA value with the SHA value saved with the relevant file portion 110 in the storage system 214. If the new SHA value and the saved SHA value do not match, the data replication method 300 can determine that the read relevant file portion 110 is bad.

The data replication method 300 can retrieve a new copy of the relevant file portion 110 from one of the storage systems 220, at 380, and replace the bad file portion 110 at the storage system 214 with the retrieved new copy of the relevant file portion 110, at 382. In selected embodiments, the data replication method 300 can immediately retrieve the new copy of the relevant file portion 110 from the other storage system 220 upon determining that the relevant file portion 110 at the storage system 214 is bad. Upon replacing the bad file portion 110, the data replication method 300 can return to the reading program, at 390. Although shown and described a comprising a relevant file portion 110 with reference to FIG. 3 for purposes of illustration and clarity only, the data replication method 300 can be performed on any predetermined number of the data portions 110, and preferably each of the data portions 110, of the file 100 without limitation.

If a storage system 214, 220 fails at a selected geographic location, immediate replacement of the failed storage system 214, 220 advantageously is not critical to the data replication system 200. The database knows each UUID and file portion 110 assigned to the failed storage system 214, 220 and how many stable file portions 110 exist within the data replication system 200. When the stable file portion count of any storage system 214, 220 reaches a preselected low threshold value, the failed storage system 214, 220 preferably is rebuilt.

The rebuild of the failed storage system 214, 220 can occur by moving all file portions 110 stored on the failed storage system 214, 220 from one or more other storage systems 214, 220 to a new storage system 214, 220 and/or to a new (or different) hard disk (or other storage media) installed at the geographic location of the failed storage system 214, 220. If a selected disk drive system is determined to be in a failure mode, the rebuild can permit the disk drive system to be evaluated and, as needed, maintenance to be performed on the disk drive system at a future date and time. As each data portion 110 is replicated in multiple locations, a database (not shown) of the data replication system 200 can keep track of each replicated data portion 110 by the associated secure hash algorithm (SHA) value, enabling the maintenance to be scheduled.

In operation, one or more storage systems 220 can be added to the data replication system 200. When the new storage system 220 is added, the system database of the data replication system 200 can be read and return returning a block SHA and a location of a remote storage system 220 that stores a good version of the failed block. In selected embodiments, the remote storage system 220 can comprise the nearest available storage system 220 with the good version of the failed block. The failed block then can be recovered from the remote storage system 220 by using the SHA and written to the new storage system 220. The system database can be updated with the location of the block as written to the new storage system 220.

This process can be repeated, as needed, for each block in the system database referring to the failed storage system 220 until all blocks have been successfully recovered. Upon completion of the process, the new storage system 220 may be added back into the data replication system 200. Advantageously, the rebuild can be performed in the background in selected embodiments. The database can be updated with the new locations of the rebuilt file portion during the rebuild or after the rebuild is completed.

Although various implementations are discussed herein, it will be understood that the principles described herein are not limited to such. For example, while particular scenarios are referenced, it will be understood that the principles described herein apply to any suitable type of computer network or other type of computing platform, including, but not limited to, a Local Area Network (LAN), a Wide Area Network (WAN), a Wireless Local Area Network (WLAN), a Metropolitan Area Network (MAN) and/or a Campus Area Network (CAN). The inventors intend any use of a phrase in the form of at least one of A, B, C and D herein to be construed as meaning one or more of A, one or more of B, one or more of C and/or one or more of D.

Accordingly, persons of ordinary skill in the art will understand that, although particular embodiments have been illustrated and described, the principles described herein can be applied to different types of computing platforms. Certain embodiments have been described for the purpose of simplifying the description, and it will be understood to persons skilled in the art that this is illustrative only. It will also be understood that reference to a "server," "computer," "network component" or other hardware or software terms herein can refer to any other type of suitable device, component, software, and so on. Moreover, the principles discussed herein can be generalized to any number and configuration of systems and protocols and can be implemented using any suitable type of digital electronic circuitry, or in computer software, firmware, or hardware. Accordingly, while this specification highlights particular implementation details, these should not be construed as limitations on the scope of any invention or of what may be claimed, but rather as descriptions of features that may be specific to particular embodiments of particular inventions.

What is claimed is:

1. A method for rapidly transferring and recovering large data sets, comprising:
    dividing a file into a plurality of file portions;
    calculating a first secure hash algorithm value for a selected file portion;
    storing the selected file portion with the first secure hash algorithm value in a first storage system at a first predetermined geographic location;
    routing the selected file portion with the first secure hash algorithm value to a second storage system at a second predetermined geographic location different from the first predetermined geographic location;
    retrieving the selected file portion stored in the first storage system;
    calculating a second secure hash algorithm value for the retrieved file portion;
    comparing the first secure hash algorithm value and the second secure hash algorithm value;
    retrieving the selected file portion with the first secure hash algorithm value from the second storage system and replacing the selected file portion with the first secure hash algorithm value stored in the first storage system with the selected file portion with the first secure hash algorithm value retrieved from the second storage system based upon said comparing; and
    calculating a cyclic redundancy check value of the first secure hash algorithm value;
    storing the cyclic redundancy check value with the selected file portion and the first secure hash algorithm value in the first and second storage systems;
    determining whether the selected file portion is properly stored in the first storage system based upon the first secure hash algorithm value and the cyclic redundancy check value; and
    based upon said determining, retrieving the selected file portion with the first secure hash algorithm value and the cyclic redundancy check value from the second storage system and replacing the selected file portion with the first secure hash algorithm value and the cyclic redundancy check value stored in the first storage system with the selected file portion with the first secure hash algorithm value and the cyclic redundancy check value retrieved from the second storage system.

2. The method of claim 1, wherein said calculating the first secure hash algorithm value comprises calculating respective first secure hash algorithm values for each of the file portions of the file, said storing includes storing the file portions with the respective first secure hash algorithm values in the first storage system, and said routing comprises routing the file portions with the respective first secure hash algorithm values to the second storage system.

3. The method of claim 2, wherein the file portions of the file have a uniform size.

4. The method of claim 3, wherein the uniform size is 128 MB.

5. The method of claim 2, wherein a predetermined file portion of the file has a first size, and wherein each of the remaining file portions of the file has a uniform second size being larger than the first size of the predetermined file portion.

6. The method of claim 5, wherein the predetermined file portion is a first file portion or a last file portion of the file, and wherein the first size comprises a native size of the predetermined file portion.

7. The method of claim 1, wherein said routing comprises routing the selected file portion with the first secure hash algorithm value to at least three storage systems at respective predetermined geographic locations each being different from the first predetermined geographic location.

8. The method of claim 7, wherein each of the storage systems is disposed on a different continent from the other storage systems.

9. The method of claim 1, wherein said determining comprises periodically determining whether the selected file portion is properly stored in the second storage system based upon the first secure hash algorithm value and the cyclic redundancy check value.

10. The method of claim 1, wherein said determining comprises determining whether the selected file portion is properly stored in the second storage system via bit rot detection.

11. The method of claim 1, further comprising determining whether the selected file portion is properly stored in the second storage system based upon the first secure hash algorithm value and the cyclic redundancy check value, and, based upon said determining whether the selected file portion is properly stored in the second storage system, retrieving the selected file portion with the first secure hash algorithm value and the cyclic redundancy check value from the first storage system and replacing the selected file portion with the first secure hash algorithm value and the cyclic redundancy check value stored in the second storage system with the selected file portion with the first secure hash algorithm value and the cyclic redundancy check value retrieved from the first storage system.

12. The method of claim 1, further comprising storing the cyclic redundancy check value with the selected file portion and the first secure hash algorithm value in a third storage system at a third predetermined geographic location, determining whether the selected file portion is properly stored in the second storage system based upon the first secure hash algorithm value and the cyclic redundancy check value, and, based upon said determining whether the selected file portion is properly stored in the second storage system, retrieving the selected file portion with the first secure hash algorithm value and the cyclic redundancy check value from the third storage system and replacing the selected file portion with the first secure hash algorithm value and the cyclic redundancy check value stored in the second storage system with the selected file portion with the first secure hash algorithm value and the cyclic redundancy check value retrieved from the third storage system.

13. The method of claim 12, wherein said replacing the selected file portion with the first secure hash algorithm value and the cyclic redundancy check value stored in the second storage system comprises immediately replacing the selected file portion with the first secure hash algorithm value and the cyclic redundancy check value stored in the second storage system with the selected file portion with the first secure hash algorithm value and the cyclic redundancy check value retrieved from the third storage system.

14. The method of claim 12, wherein the third predetermined geographic location is distal from the first and second predetermined geographic locations.

15. The method of claim 12, further comprising designating the selected file portion as being stable when the selected file portion is confirmed to be properly stored on the first, second and third storage systems.

16. The method of claim 15, further comprising determining that a number of stable file portions on the second storage system is less than a predetermined threshold value and, based upon said determining that the number of stable file portions on the second storage system is less than the predetermined threshold value, rebuilding the second storage system on a fourth storage system by moving copies of the selected file portion with the first secure hash algorithm value and the cyclic redundancy check value stored on the second storage system from the first and third storage systems to the fourth storage system.

17. The method of claim 1, further comprising assigning a unique global value to the selected file portion for keeping track of a first location of the selected file portion as stored on the first storage system and a second location of the selected file portion as stored on the second storage system, wherein said storing includes storing the unique global value with the selected file portion at the first storage system, and wherein said routing includes routing the unique global value with the selected file portion to the second storage system.

18. A product for rapidly transferring and recovering large data sets by replicating one or more file portions of a file, the product being a combination of a computer program and non-transitory machine-readable storage media, comprising:
instruction for calculating a first secure hash algorithm value for a selected file portion; instruction for storing the selected file portion with the first secure hash algorithm value in a first storage system at a first predetermined geographic location;
instruction for routing the selected file portion with the first secure hash algorithm value to a second storage system at a second predetermined geographic location different from the first predetermined geographic location;
instruction for retrieving the selected file portion stored in the first storage system;
instruction for calculating a second secure hash algorithm value for the retrieved file portion;
instruction for comparing the first secure hash algorithm value and the second secure hash algorithm value;
instruction for retrieving the selected file portion with the first secure hash algorithm value from the second storage system and replacing the selected file portion with the first secure hash algorithm value stored in the first storage system with the selected file portion with the first secure hash algorithm value retrieved from the second storage system if the first secure hash algorithm value and the second secure hash algorithm value do not match; and
instruction for calculating a cyclic redundancy check value of the first secure hash algorithm value;
instruction for storing the cyclic redundancy check value with the selected file portion and the first secure hash algorithm value in the first and second storage systems;
instruction for determining whether the selected file portion is properly stored in the first storage system based upon the first secure hash algorithm value and the cyclic redundancy check value; and
instruction for retrieving the selected file portion with the first secure hash algorithm value and the cyclic redundancy check value from the second storage system and replacing the selected file portion with the first secure hash algorithm value and the cyclic redundancy check value stored in the first storage system with the selected file portion with the first secure hash algorithm value and the cyclic redundancy check value retrieved from the second storage system, based upon said determining.

19. A system for rapidly transferring and recovering large data sets by replicating one or more file portions of a file, comprising:
first and second storage systems, said second storage system being geographically remote from said first storage system; and
a processing system being proximate to said first storage system and being configured for:
dividing the file into the file portions;
calculating a first secure hash algorithm value for a selected file portion;
storing the selected file portion with the first secure hash algorithm value in said first and second storage systems;
retrieving the selected file portion stored in said first storage system;
calculating a second secure hash algorithm value for the retrieved file portion;

comparing the first and second secure hash algorithm values;

if the first and second secure hash algorithm values do not match, retrieving the selected file portion with the first secure hash algorithm value from said second storage system and replacing the selected file portion with the first secure hash algorithm value stored in said first storage system with the selected file portion with the first secure hash algorithm value retrieved from said second storage system;

calculating a cyclic redundancy check value of the first secure hash algorithm value;

storing the cyclic redundancy check value with the selected file portion and the first secure hash algorithm value in the first and second storage systems;

determining whether the selected file portion is properly stored in the first storage system based upon the first secure hash algorithm value and the cyclic redundancy check value; and based upon said determining, retrieving the selected file portion with the first secure hash algorithm value and the cyclic redundancy check value from the second storage system and replacing the selected file portion with the first secure hash algorithm value and the cyclic redundancy check value stored in the first storage system with the selected file portion with the first secure hash algorithm value and the cyclic redundancy check value retrieved from the second storage system.

\* \* \* \* \*